United States Patent [19]
Hultin et al.

[11] Patent Number: 6,005,073
[45] Date of Patent: Dec. 21, 1999

[54] PROCESS FOR ISOLATING A PROTEIN COMPOSITION FROM A MUSCLE SOURCE AND PROTEIN COMPOSITION

[75] Inventors: Herbert O. Hultin, Rockport; Stephen D. Kelleher, Wakefield, both of Mass.

[73] Assignee: Advanced Protein Technologies, Inc., Rockport, Mass.

[21] Appl. No.: 08/797,929

[22] Filed: Feb. 12, 1997

Related U.S. Application Data

[60] Provisional application No. 60/034,351, Dec. 21, 1996.

[51] Int. Cl.⁶ .................................................. C07K 01/14
[52] U.S. Cl. .............................. 530/350; 530/412; 514/2
[58] Field of Search .................................... 530/350, 412; 514/2

[56] References Cited

PUBLICATIONS

Wilmon W. Meinke, Muhammad A. Rahman and Karl F, Mattil, Journal of Food Science, vol. 37, (1972) pp. 195–198, Some Factors Influencing The Production of Protein Isolates From Whole Fish.

Meinke et al, Journal of Food Science, vol. 37, 1972, pp. 195–198 Some Factors Influencing The Production of Protein Isolates From Whole Fish.

Meinke et al, Journal of Food Science, vol. 38, (1973), pp. 864–866, Autolysis as a Factor in the Production of Protein Isolates from Whole Fish.

Wilmon W. Meinke and Karl F. Mattil, Journal of Food Science, vol. 38, (1973), pp. 864–866, Autoysis as a Factor in the Production of Protein Isolates From Whole Fish.

Meinke et al, Journal of Food Science, vol. 37, 1972, pp. 195–198 Some Factors Influencing the Production of Protein Isolates From Whole Fish.

Meinke et al, Journal of Food Science, vol. 38,(1973), pp. 864–866, Autolysis as a Factor in the Production of Protein Isolates from Whole Fish.

Journal of Aquatic Food Product Technology, vol. 5(4), (1996), pp. 43–59 Onodenalore et al.

Journal of Food Science, vol. 61, No. 2, (1996), pp. 362–366 and 371, Chawla et al.

Venugopal et al, Thermostable Water Dispersions of Myofibrilla Protein from Atlantic Mackerel (*Scomber scombrus* 7, Journal of Food Science, vol. 59, No.2, (1994), pp. 265–276.

Cuq et al, Edible Packaging Films based on Fish Myofibrillar Proteins; Formulation and Functional Properties, Journal of Food Science, vol. 60, No. 6, (1995), pp. 1369–1374.

Shahidi et al, Water Dispersions of Myofibrillar Proteins From Capelin (*Mallotus villosus*), Food Chemistry 53 (1995) 51–54.

Shahidi et al, Solubilization and Thermostability of Water Dispersions of Muscle Structured Proteins of Atlantic Herring (*Clupea horengus*), J. Agric. Food Chem., vol. 42, No. 7, (1994), pp. 1440–1446.

Shahidi et al, Notes & Digests, Meat Focus International–Oct. (1983), pp. 443–445.

FSTA #1, Yang, FSTA AN#95(02): 50115, 1994.
FSTA#2, SALAM, FSTA AN#94(12): 50080, 1994.
FSTA #3, Han–Ching, FSTA AN#94(04): R0024, 1993.
FSTA#4, Chen, FSTA AN#92(12): 50138, 1991.
FSTA #5, Liu, FSTA#92(12):50137, 1991.
FSTA #6, Pan, FSTA#92(12):50136, 1991
FSTA#7, Yang, FSTA#92(12):50118, 1992.
FSTA #8, Kee, FSTA#92(02):50122.
Onodenalone et al., "Protein Dispersions & Hydrolysates from Shark" FSTA ABS #97(04):R0032, (1996).

*Primary Examiner*—Cecilia J. Tsang
*Assistant Examiner*—Patrick R. Delaney

[57] ABSTRACT

A process is provided for isolating a protein component of animal muscle tissue by mixing a particulate form of the tissue with an acidic aqueous liquid having a pH below about 3.5 to produce a protein rich solution. A protein rich aqueous solution is separated from solids and lipids, including membrane lipids. The protein rich aqueous solution can be treated to effect protein precipitation, followed by protein recovery.

22 Claims, 4 Drawing Sheets

ASP PROCESS

ASP PROCESS

6,005,073

PROCESS FOR ISOLATING A PROTEIN COMPOSITION FROM A MUSCLE SOURCE AND PROTEIN COMPOSITION

Applicant claim the benefit of the filing date of Provisional application Ser. No. 60/034,351, filed Dec. 21, 1996.

This invention was made with government support under Grant NA90AA-D-SG424 awarded by the U.S. Department of Commerce (NOAA). The government has certain rights in the invention.

BACKGROUND OF THE INVENTION

1. Field of the Invention

This invention relates to a process for recovering protein from an animal muscle source and to the product so-obtained. More particularly, this invention relates to a process for recovering muscle proteins from an animal source and to the protein product so-obtained.

2. Description of Prior Art

Presently, there is an interest in expanding the use of muscle proteins as food because of their functional and nutritional properties. Better use of these materials would be particularly important with low value raw materials for which there is currently little or no human food use. These raw materials include the fatty, pelagic fish and deboned muscle tissue from fish and poultry processing. However, the use of these materials has been hampered because of the loss of functionality of the proteins during processing, the instability of the product due to lipid oxidation, and unappealing characteristics such as dark colors, strong flavors, unsightly appearance and poor texture. Protein functionalities of most concern to food scientists are solubility, water holding capacity, gelation, fat binding ability, foam stabilization and emulsification properties. A considerable effort has been spent to produce a protein concentrate from under utilized fish species. This effort has met with only limited success. In one example, it was thought necessary to remove the lipids by an organic solvent extraction process to stabilize the product. This is not only expensive and requires recycling of the solvent, but it has the serious problem of destroying the functional properties of the protein. As a nutritional supplement, it can not compete in cost against the proteins from soy and its poor solubility and water-binding characteristics prevents it from being added as a functional component in most products.

In an alternative approach, protein concentrates from muscle tissue, especially fish, have been made by hydrolysis. This approach has improved some functional properties, particularly solubility, which has allowed its use in prepared soups. However, this approach also destroys other functional properties such as gelling ability. The raw materials that can be used in these products are limited due to sensitivity to undesirable lipid oxidation. Thus, at the present time, moderate success has only been achieved with relatively expensive lean, white fleshed fish as the source of the animal protein.

One process that has had some success in stabilizing protein foods has been the process for producing "surimi". This has been used primarily for fish, although there have been some attempts to produce a surimi-like product from other raw materials such as deboned poultry mince. In producing surimi, the muscle is ground and washed with a variable amount of water a variable number of times. This is determined by the location of the plant and the product that is desired from the particular species. Water may be used in a ratio as low as about 2 parts water to one part fish up to about 5 parts water per 1 part fish; typically about 3 parts water are used per 1 part fish. The number of washes can vary, generally, from 2 to 5, again depending on the raw material, the product desired, and water availability. Twenty to thirty per cent of the fish muscle proteins are solubilized when the ground muscle is washed with water. These soluble proteins, known as sarcoplasmic proteins, are generally not recovered from the wash water of the process. This loss is undesirable since sarcoplasmic proteins are useful as food. The washed minced product containing the protein in solid form then is used to make protein gels. Originally, this was used to produce "kamaboko" in Japan. Kamaboko is a popular fish sausage in which the washed minced fish is heated until it gels.

It is presently believed that it is necessary to add cryprotectants to the washed, minced fish before freezing to prevent protein denaturation. A typical cryoprotectant mixture comprises about 4% sucrose, about 4% sorbitol and about 0.2% sodium tripolyphosphate. These components retard the denaturation of the protein during freezing, frozen storage and thawing. High quality surimi has generally only been produced from lean white fish. Much effort has been made into determining how to make a quality product from dark-fleshed, pelagic fatty species. As discussed above, these species as a protein source have limitations based on stability to lipid oxidation, color, poor gelling ability, low yields, and the necessity for using very fresh raw material. The most successful Japanese process for producing a surimi from a dark-fleshed fish loses about 50–60% of the total protein of the muscle tissue. It also can have color and lipid stability problems.

It has been proposed by Cuq et al, Journal of Food Science, pgs. 1369–1374 (1995) to provide edible packaging film based upon fish myofibrillar proteins. In the process for making the films, the protein of water-washed fish mince is solubilized in an aqueous acetic acid solution at pH 3.0 to a final concentration of 2% protein. This composition has a sufficiently high viscosity because of the use of acetic acid so that membranes could not be separated by the procedure of this invention. The viscosity of these solutions was further increased by the addition of 35 g of glycerol per 100 g of dry matter to obtain sufficiently high solution viscosities so that films could be formed. These compositions contain insufficient concentrations of water to avoid highly viscous solutions or gels. Thus, the undesirable non-protein fractions including membrane lipids which affect product quality can not be removed from the protein fraction. In addition, the use of acetic acid imparts a strong odor to the material which would severely limit its use in a food product.

It also has been proposed by Shahidi and Onodenalore, Food Chemistry, 53 (1995) 51–54 to subject deboned, whole capelin to washing in water followed by washing in 0.5% sodium chloride, followed by washing in sodium bicarbonate. The series of washes, including that using sodium bicarbonate, would remove greater than 50% of the muscle proteins. Essentially all of the sarcoplasmic proteins would be removed. Final residue was further washed to remove residual bicarbonate. The washed meat was then suspended in cold water and heated at 70° C. for 15 min. This heat treatment is sufficient to "cook" the fish proteins, thus denaturing them and reducing or eliminating their functional properties. The dispersion is centrifuged at 2675×g for 15 minutes and the protein in the supernatant is determined at pH between 3.5 and 10.0. The dispersion required heating at 100° C. to reduce the viscosity. The reduced viscosity, however, was still much greater than is achieved with the process of this invention. The resultant suspensions of Shahidi and Onodenalore were sufficiently concentrated so that membrane lipids cannot be separated from the protein by centrifugation.

Shahidi and Venugopal, Journal of Agricultural and Food Chemistry 42 (1994) 1440–1448 disclose a process for subjecting Atlantic herring to washing in water followed by washing with aqueous sodium bicarbonate. Again, this process will remove greater than 50% of the muscle proteins, including the sarcoplasmic proteins. The washed meat was homogenized and the pH varied between 3.5 and 4.0 with acetic acid. As mentioned above, the acetic acid produces a highly viscous suspension under these conditions and does not permit separation of membrane lipids from proteins by centrifugation. In addition, there is an odor problem with the volatile acetic acid.

Venugopal and Shahidi, Journal of Food Science, 59, 2 (1994) 265–268, 276 also disclose a process for treating minced Atlantic mackerel suspended in water and glacial acetic acid at a pH of 3.5. This gives a material that is too viscous to permit separation of membrane lipids from protein by centrifugation. It also has the odor problem caused by acetic acid.

Shahidi and Venugopal, Meat Focus International, October 1993, pgs 443–445 disclose a process for forming homogenized herring, mackerel or capelin in aqueous liquids having a pH as low as about 3.0. It is reported that acetic acid reduces the viscosity of herring dispersions, increases viscosity of mackerel dispersions to form a gel and precipitates capelin dispersions. All of these preparations were initially washed with sodium bicarbonate, which would remove a substantial proportion of the protein, including the sarcoplasmic proteins. No process step is disclosed which permits separation of proteins from membrane lipids.

Accordingly, it would be desirable to provide a process for recovering a high proportion of available muscle protein from an animal source. It would also be desirable to provide such a process, which permits the use of muscle protein sources which are presently underutilized as a food source such as fish having a high fat or oil content. Furthermore, it would be desirable to provide such a process which recovers substantially all of the protein content of the process feed material. In addition, it would be desirable to provide such a process which produces a stable, functional, protein product which is particularly useful for human consumption.

BRIEF DESCRIPTION OF THE INVENTION

This invention is based upon our newly discovered properties of the myofibrillar proteins of muscle tissue which permits their processing at low pH, below about 3.5. Muscle tissue (fish or meat) is disrupted to form particles, such as by being ground or homogenized with enough water and at a pH to solubilize a major proportion, preferably substantially all of the available protein and to reduce the viscosity to allow easy separation of insoluble materials from the solubilized composition. Solubilization is effected at a low pH below about 3.5, but not so low as to effect substantial destruction of proteins, preferably between about 2.5 and about 3.5. This process differs from the conventional process in that major myofibrillar proteins are never solubilized in the conventional process. In the conventional process, myofibrillar proteins are simply washed in water or in water that has been made slightly alkaline to remove water-soluble materials that lead to loss of quality of the product. Unfortunately, this conventional process also removes water-soluble sarcoplasmic proteins.

In an optional embodiment of this invention, the disrupted muscle issue can be mixed with an aqueous solution to give a pH between about 5.0 and about 5.5 to provide a suspension of muscle particles which can be more easily treated to solubilize proteins in the subsequent low pH treatment step to produce a solution having a sufficient low viscosity, i.e., a non-gel, so that it can be easily processed. By conducting this optional preliminary step at pH between about 5.0 and about 5.5, a homogeneous suspension is obtained wherein the protein does not imbibe excessive concentration of water. Thus, reduced volumes of water are processed which must be treated to effect the desired lower pH in the subsequent solubilization step.

In the process of this invention, other optional steps can include some prior removal of the dark muscle if it is so desired. An alternative optional step is that of first removing excess oil by centrifuging or pressing ground muscle prior to adding the water and acid. After the muscle proteins have been solubilized, they are centrifuged at an adequate force to sediment the membrane portion of the tissue and to cause the non-membrane lipids to float to the top of the resultant composition where they can form a layer. These lipids can be skimmed off and the soluble supernatant, protein-rich fraction is recovered such as by decantation.

The recovered supernatant then is treated to precipitate the proteins such as by raising its pH to between about 5.0 and about 5.5, addition of salt, the combination of salt addition and increase in pH, the use of a coprecipitant such as a polysaccharide polymer or the like to recover a protein product containing myofibrillar proteins and a significant proportion of the sarcoplasmic protein of the original muscle tissue proteins in the original muscle tissue process feed. The protein product is substantially free of membrane protein present in the original animal tissue process feed. These membrane proteins are recovered in the sediment resulting from the centrifugation step set forth above. The substantial absence of the membrane proteins in the product of this invention distinguishes it from presently available processes which produces products containing substantial proportions of the original membrane protein in the original animal tissue feed.

In an alternative process, this precipitation step need not be conducted to recover the protein product. The protein product can be treated directly without raising its pH such as by precipitation with a salt and spray drying to be used, for example, in acidic foods. Alternatively, the low pH protein-rich solution can be treated to improve its functional properties, such as with an acidic proteolytic enzyme composition or by fractionating the protein.

The precipitated protein composition recovered at the higher pH condition can be further treated to produce a food product. Such further treatment can include lyophilization, freezing with or without an added cryoprotectant composition and with or without raising its pH or gelation by raising its pH.

DESCRIPTION OF SPECIFIC EMBODIMENTS

Figure 1:
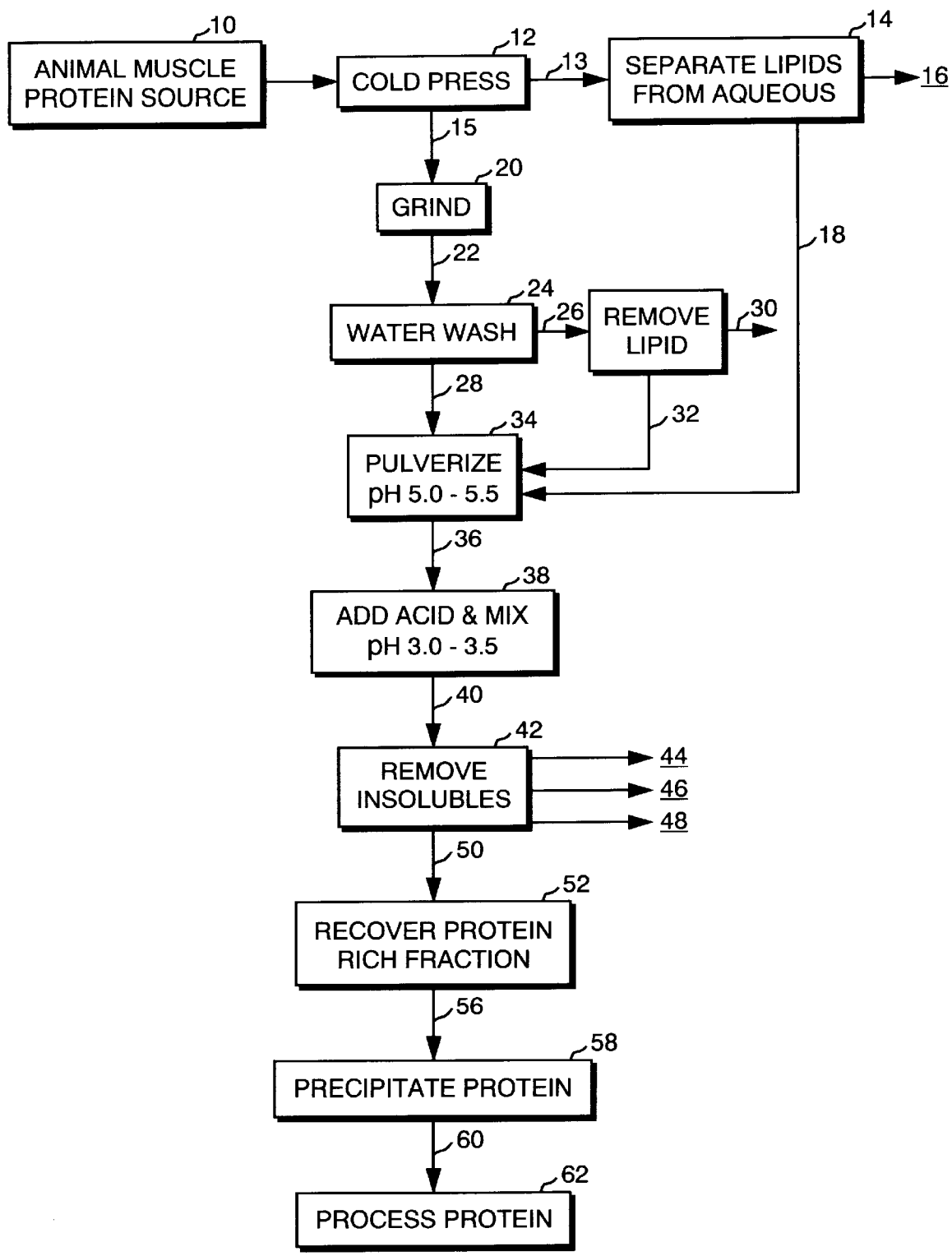
FIG. 1 is a general schematic diagram illustrating the process of this invention.

In accordance with this invention, disrupted to form particles such as by grinding, homogenization or the like, as an optional preliminary step, an animal muscle tissue source of protein is ground and mixed with an aqueous liquid at a pH below about 3.5 and at a ratio of volume of aqueous liquid to weight of tissue to form an aqueous composition which does not have an undesirably high viscosity which renders separation of membrane constituents from the protein difficult. Typically, the ratio of volume of aqueous liquid to weight of tissue is greater than about 7:1, preferably greater than about 9:1. By utilizing these conditions of pH and ratio of aqueous liquid volume to tissue weight, the protein component of the tissue is dissolved in the aqueous liquid while avoiding gelation of the composition in this step or in a subsequent separation step. The pH should not be so low as to destroy a substantial portion of the protein over the time period the protein is in solution i.e., below about pH 1.0. Protein denaturation and protein hydrolysis also is a function of temperature and time in solution with increased temperature and increased time in solution promoting protein denaturation and protein hydrolysis. Thus, it is desirable to reduce solution temperature and the time protein is in solution, particularly when a lower pH of the protein solution is attained, for example, about 2.0 or below. The aqueous composition also may contain components which do not degrade or hydrolyze the proteins in solution such as salts, for example, sodium chloride or the like. The ionic strength of the solution should be maintained below about 200 mM to avoid protein precipitation.

The low pH protein solution then is treated to separate insolubles, including lipids, fats, oils, bone, skin, membrane tissue and the like to form the low pH aqueous solution of protein such as by centrifugation. This separation promotes stability of the recovered protein, particularly since it is free of membrane lipids. This low pH protein solution differs from prior art low pH protein composition in that the substantial majority of the protein remains in solution and does not form a gel even during centrifugation so that the insoluble impurities can be separated from the protein. These insoluble impurities include membrane lipids which themselves degrade and render the product unacceptable. When utilizing centrifugation as a separation means and the ratio of tissue weight to volume of aqueous liquid is below about 1:20, the centrifuged composition generally separates into four phases with the top phase comprising a light phase containing neutral lipids, an aqueous liquid phase containing a substantial majority of the proteins, a sediment or pellet phase containing solids including bone, skin, cell membrane and membrane lipids. A fourth phase positioned between the aqueous liquid phase and the pellet phase forms comprising a gel-like phase containing a substantial minority of the proteins in the form of entrapped protein. This gel-like phase can be recovered and recycled either upstream or downstream in the process to recover this entrapped protein. When utilizing protein compositions wherein the tissue weight to aqueous liquid volume is above about 1:20, this gel-like layer is not formed and substantially all of the protein is present in the aqueous liquid phase.

In an optional preliminary step, the disrupted animal muscle tissue is mixed with an acidic aqueous solution to a pH of about 5.0 to about 5.5. Thereafter, the pH of the mixture is reduced with acid as described above in order to solubilize the proteins. It has been found that this preliminary mixing step provides protein solutions of reduced viscosity in the low pH treatment step described above and therefore, promotes ease of processing to separate insolubles from the dissolved protein.

At this point, the solubilized composition can be fractionated, in order to recover a particular desired protein fraction or derived product fraction if desired by size exclusion chromatography or other techniques based on properties of the proteins, other than molecular size, since the materials are solubilized in a solution of low viscosity. Alternatively, the protein in solution can be dehydrated, for example, by spray drying, to produce a functional protein for use in acid foods such as salad dressing, mayonnaise, gels or as a nutrient supplement to fruit juices, sodas, or the like. This point of the process provides a convenient time to treat the dissolved proteins with acidic proteolytic enzymes, if desired to modify the proteins to improve their functional properties as desired. Some limited proteolysis may occur at the low pH. This proteolysis depends on time, temperature, and the specific pH value.

The recovered protein-rich supernatant can then be adjusted to a pH at which essentially all of the proteins precipitate. This pH will vary depending upon the animal source of the protein and is generally between about 5.0 and about 5.5, more usually between about 5.3 and about 5.5. The protein can be recovered again, such as by centrifugation or with a polymeric precipitant, e.g., a polysaccharide or combination thereof or the like. Not only are all of the myofibrillar and cytoskeletal proteins recovered, but the soluble sarcoplasmic protein fraction which has been previously solubilized at the reduced pH below about 3.5 is also precipitated by raising the pH to between about 5.0 and about 5.5. This recovery of the sarcoplasmic proteins is not observed when the sample is directly reduced in pH to about 5.5 and centrifuged. It is necessary to attain the low pH condition and then return to the pH condition where protein precipitation is effected to prevent this protein loss. When the low pH condition is not preliminarily obtained, the protein loss is generally between about 20 and about 30% of the original process feed protein, primarily due to loss of sarcoplasmic protein. The precipitated protein is separated from the aqueous liquid compositions which contain soluble impurities such as low molecular weight metabolites, sugars, phosphates and/or nucleotides. Alternatively, protein precipitation can be attained with precipitating polymers such as polysaccharides, charged polymers, marine hydrocolloids including alginates or carrageenan or the like either alone or in combination with centrifugation. While applicants do not intend to be bound by a particular theory to support unproved protein recovery, this enhanced recovery may be due to either molecular changes in the sarcoplasmic proteins whence they become insoluble at that pH, or they may bind more readily to the myofibrillar and cytoskeletal proteins due to molecular changes in the latter proteins. Alternatively, it may be that the opening up of the myofibrillar and cytoskeletal proteins provide more binding sites for the sarcoplasmic proteins.

The rate at which the pH of optimal precipitation is reached can have an effect on the nature of the association of the collected proteins. Rapid change in pH by direct addition of base can produce an aggregated mass of proteins whereas a slow change in pH, for example, that achieved by dialysis, can allow proteins to specifically associate with the proteins with which they are normally associated in the fibrils.

Any acid that does not undesirably contaminate the final product can be used to lower the pH such as organic acids including citric acid, malic acid, tartaric acid or the like or mineral acids such as hydrochloric acid or sulfuric acid or the like or mixtures thereof. Citric acid which has favorable $pK_a$ values is a preferred acid for the process. Sufficient citric acid provides adequate buffering capacity at pH 3 and pH 5.5 and then hydrochloric acid can be used to reduce the pH to the desired point. Acids that have significant volatility which impart undesirable odor such as acetic acid or butyric acid are undesirable. In addition, the acid should effect a reduced viscosity of the protein containing product so that the membrane constituents can be separated from the protein. Likewise, any of several bases can be used to raise the pH. It is preferred to add a polyphosphate since this also functions as an antioxidant and improves the functional properties of the muscle proteins.

The precipitated protein optionally can be treated in many ways. For example, its pH may be raised to neutrality, cryoprotectants added, and frozen to make a typical "surimi". Surimis prepared by this process have excellent quality while avoiding lipid oxidation odor. The "true strain" (a measure of protein quality) has been as high as 2.8 for cod and 2.6 for mackerel light muscle as animal protein sources. The product has little or no lipid. A surprising finding is that the color of the product from mackerel is also very good, being as good as a surimi prepared from lean white fish, at least with a whiteness index of about 75. For example, surimi prepared from mackerel light muscle has a whiteness index of 78.3, well within the range for Grade A A. Alternatively, the precipitated protein can be dehydrated after the addition of agents currently used in surimi processing such as starches to prevent aggregation of the protein, such as, but not limited to, negatively charged compounds for use in the production of products such as gels, emulsifiers and viscosity developers. The precipitated protein can also be re-acidified to pH of from about 2.5 to about 3.5 using less liquid volume than it previously contained to concentrate the protein prior to dehydration. This provides energy savings for the dehydration step. In addition the recovered protein compositions can be fractionated to recover constituent proteins. The resultant product is useful as an ingredient in products such as those described above.

This invention improves upon the prior art in that:

1. Removal of essentially all of the lipid stabilizes the product against oxidation. This renders the process especially useful with fatty muscle tissues as a feed composition, which are typical of low cost raw materials, such as would be found in the fatty pelagic fish species or deboned poultry meat.

2. The process of this invention provides for increased yield of protein. Greater than about 90% of protein typically are obtained from light muscle tissues with the process of this invention, whereas prior art similar processes provide less than about 60% protein recovery. In some cases, the protein yields obtained with the present invention are as great as about 95%.

3. The improved yield of protein as product means that there is less protein to recover/remove in the waste water, so that by-product pollution is decreased.

4. It is not necessary in the process of this invention to require very fresh product as a starting material even when pelagic fish is utilized as a feed. Good results have been obtained with frozen pelagic fish such as pelagic fish frozen for more than one year and even when rancid as shown by having 150 TBARS characteristically as a result of oxidation. For example, headed and gutted capelin stored at about −20° C. frozen for an extended period of time of about one year (rancid) as a starting material was capable of providing a product with strain and stress values of 2.37 and 45 kPa, respectively. The ability of the process of this invention to use non-fresh and even frozen fish is very important for a fishing fleet catching the fish and permits use of shore-based plants to effect the process of this invention since it eliminates the requirement for using fresh fish fillet sources now required by presently available processes.

5. The color of the product of this invention is much improved over the color of prior art products. The color of surimi now made from pelagic fish with presently available processes is typically grayish in color with a high Hunter "b" value. A white color as good or better than the best grade of surimi made from lean white-fleshed fish from presently available processes is obtained with the process of the present invention from the light muscle of mackerel as the starting animal protein source. As a process feed material, mackerel light muscle from fish stored between 2 and 3 days on ice typically provides a product of this invention having "L", "a", "b" values of 78.4,−0.89, and 2.0, with a whiteness index of 78.3 or better.

6. In prior art processes, a majority of the muscle proteins are insoluble throughout the process. The process of this invention solubilizes approximately 98% of the muscle proteins and is readily adapted to a process feed comprising a product made by conventional deboning machinery since solubilization of the protein allows for the complete removal and separation of bone or skin fragments from the desirable protein fractions, which are considered major defects in presently available surimi products. The process of this invention eliminates the need for a refiner apparatus which effects loss of protein products. This advantage allows the processing of whole fish rather than fillets with concomitant increases in yield.

7. It is possible with the present invention to reduce the toxic components in fish that are soluble in lipids. These toxic components include components such as PCB's (polychlorinated biphenyls).

An obvious use for the process of this invention is to utilize materials which are not available now as human foods because of their instability and unfavorable sensory qualities. A good example of the use in the present invention are the small pelagic species of fish such as herring, mackerel, menhaden, capelin, anchovies, sardines, or the like as starting materials, which presently are either underutilized or are used primarily as industrial fish and not for human consumption. Approximately one half the fish presently caught in the world are not used for human food. A process that produces an acceptable stable protein concentrate for human consumption constitutes an important value-added use of this material and an important contribution to world nutrition. For example, the estimated annual sustainable yield of mackerel, menhaden and herring available off the Atlantic coast of the United States is as high as 5 billion pounds. The process of this invention also can be used to process flesh that is recovered from farmed fish after the fillets have been removed. This material currently is not used for human food. Representative suitable starting sources of animal protein for the process of this invention include fish fillets, deheaded and gutted fish, including pelagic fish, crustacea, e.g., krill, mollusc, eg. squid or chicken, beef, lamb, sheep or the like. For example, a large quantity of mechanically deboned chicken meat presently is produced from the skeletons of the birds after chicken parts are removed for retail sale and there is very little usage of this material. The process of the present invention can utilize such chicken parts to produce protein rich product useful for human enterprise. Other underutilized muscle sources adaptable to the process of this invention include Antarctic krill, which is available in large quantities but is difficult to convert to human food because of its small size. The process also is capable of utilizing most unstable or low value muscle tissue.

A specific example of the process of the present invention comprises a plurality of steps, including optional steps. In a first step, an animal protein source is ground to produce a composition of particles having a high surface area which promotes subsequent processing. In an optional second step, the ground protein source can be washed with water, typically with about 1 to 9 or more volumes of water based on the weight of ground muscle source. Washing can be effected in a single step or in a plurality of steps. When utilizing the optional washing step, the liquid soluble fraction is separated from the insoluble fraction such as by centrifugation with the insoluble fraction being processed further as described below. The liquid fraction contains solubilized proteins and lipids. While this washing step removes a portion of undesirable lipids, it also undesirably removes proteins, particularly sarcoplasmic proteins. Thus, in an optional step, the liquid soluble fraction can be subjected to a separation step, such as by centrifugation, to separate the lipids from the protein-rich water fraction. The recovered protein-rich water fraction then can be introduced downstream into the process for further processing the insoluble fraction from the washing step so that the proteins in the wash liquid soluble fraction can be recovered. The insoluble fraction comprising the ground animal protein source is pulverized with water which also can contain acid, such as citric acid to obtain a pH from about 5.3 to about 5.5 to produce small particles which promote their solubilization in a subsequent step wherein the pH of the composition is reduced. When conducting this step at a pH between about 5.3 and about 5.5, undesirable swelling of the composition is avoided or minimized.

The composition of pulverized protein-rich composition then is mixed with an acid composition to reduce the pH below about 3.5 but not so low as to significantly destroy the protein, such as about 2.0 or even as low as about 1.0. Suitable acids are those which do not significantly destroy the protein and do not render the final product toxic. Representative suitable acids include hydrochloric acid, sulfuric acid or the like. This process step conducted at low pH contrasts with the prior art process conditions at a high pH close to neutral pH. The resulting composition comprises a low viscosity solution in which substantially all of the protein from the animal protein source is soluble.

The low pH solution then is fractionated to separate lipids, including membrane lipids from the aqueous fraction or fractions, such as by centrifugation. When utilizing centrifugation, the centrifuged product typically comprises four layers. The top layer comprises light lipids containing omega-3 lipids such as triglycerides in the case of fish which can be easily recovered such as by skimming or decantation. The bottom layer comprises membrane lipids, rich in phospholipids, cholesterols and sterols which are heavier than water because of their association with membrane proteins and solids, such as bone, when present. The lipid fractions also can contain lipid soluble toxins such as polychlorinated biphenyls (PCB's) that are commonly found in fish having a high fat or oil content. The middle two levels comprise an upper, protein-rich, low viscosity aqueous layer and a lower, protein-rich gel layer. The protein-rich aqueous layer is recovered for further processing as described below. The protein-rich gel layer also can be recovered and processed to convert the gel to a low viscosity solution such as by adding water, an acidic aqueous solution or the protein-rich aqueous liquid layer and recycling it to the process to recover protein.

The protein in the low viscosity solution then is treated to precipitate the proteins. Prior to the precipitation step, the protein-rich gel layer which has been treated to convert the gel to a low viscosity solution can be mixed with the low viscosity aqueous solution or further treated separately. The protein in solution then is precipitated such as by raising the solution pH above about 5.0, preferably to about 5.5. Alternatively, salt or a precipitating polymer can be used to effect precipitation. When the above-described washing step of the initially ground tissue is eliminated, the water-soluble protein, particularly the sarcoplasmic protein from the ground tissue is recovered in this step. Typically, the sarcoplasmic protein comprises about 20–30% of the total protein in the original tissue. The processes of the prior art do not recover this protein. While the initial washing step removes this protein from the tissue being processed, it can be recovered in the process of this invention as described above. Even when this initial washing step is included in the process of this invention and the protein is not recovered, the process of this invention provides substantial advantages since it is capable of processing animal protein sources, including high fat and high oil sources which can not be economically processed to produce food for human consumption with presently available processes.

The product of this invention differs from the products of the prior art in that the product of this invention is substantially free of membrane lipids which are separated with the lowermost lipid fraction described above. In contrast, the products of the prior art contain between about 1 and about 2 percent membrane protein based upon the total weight of products. In addition, the product of this invention which comprises primarily myofibrillar protein, also contains significant amounts of sarcoplasmic protein. The sarcoplasmic protein in the protein product typically comprises above about 8%, preferably above about 15% and most preferably above about 18% sarcoplasmic proteins by weight, based on the total weight of protein in the product.

The precipitated product can be used directly as a food source. Alternatively, the precipitated product can be further treated such as by removing a portion of the water in the product, by lyophilization, freezing, or heat drying. The resultant product can be in the form of a solution, a gel or a dry particulate product. The product is useful as a food grade composition for human consumption and has a wide variety of uses. The product can be used, for example, to form the major portion of artificial crab meat or as a food additive such as a binding agent or the like. In addition, the product can be used as an emulsifier, as a thickening agent, as a foaming agent, as a gelling agent, as a water binding agent or the like, particularly in food products.

FIG. 1 illustrates the general process of this invention including some optional process steps. In an optional first step an animal muscle protein source 10 is introduced into a conventional cold press or centrifugation or the like, step 12 wherein the feed, such as ground fish, is subjected to a pressure, to separate an aqueous liquid containing fats and oils 13 from solid tissue 15. The liquid then can be processed in separation step 14, such as by centrifugation to separate a stream 16 rich in fat and oil from an aqueous rich stream 18 which contains solubilized protein. The solid animal tissue 15 then is ground in step 20 to increase its surface area. Alternatively, steps 12 and 20 can be reversed. The ground tissue 22 optionally can be water washed in step 24 to produce a liquid stream 26 and a solid stream 28. The liquid stream 26 can be separated further such as by centrifugation to produce a stream 30 rich in fat and/or oil and an aqueous rich stream 32 which contains solubilized protein.

The solid stream 28 is pulverized and its pH reduced with an aqueous acidic solution to about 5.0 to about 5.5 in step 34. The aqueous composition, low in solids content 36 then is mixed with acid in step 38 to reduce its pH to between about 3.0 and about 3.5. The optional, aqueous rich, protein containing streams 18 and 32 can be added to step 38 for processing therein. The resultant low pH composition 40 is subjected to a separation step 42, such as by centrifugation or filtration, to separate a light lipid stream 44 from a heavy stream 46 containing bone, skin, membrane, etc., and from an aqueous, protein rich fraction 50 containing myofibrillar protein and sarcoplasmic protein but substantially free of membrane protein. The protein rich fraction 50 is recovered in step 52 and, directed to step 56 wherein its pH is raised to between about 5.0 about 5.5 to effect precipitation of substantially all protein in solution. Optionally, stream 56 can be treated such as by salt precipitation at ionic strengths above about 200 mM, precipitation with a precipitating polymer or combinations thereof or the like, rather than being precipitated in step 58. The precipitated protein 60 can be further processed in step 62 such as by lyophilization, freezing in the presence of a cryoprotectant or by being gelled.

The following example illustrates the present invention and are not intended to limit the same.

EXAMPLE 1

This example provides a comparison of the process of this invention to a presently used process of the prior art.

Figure 2:
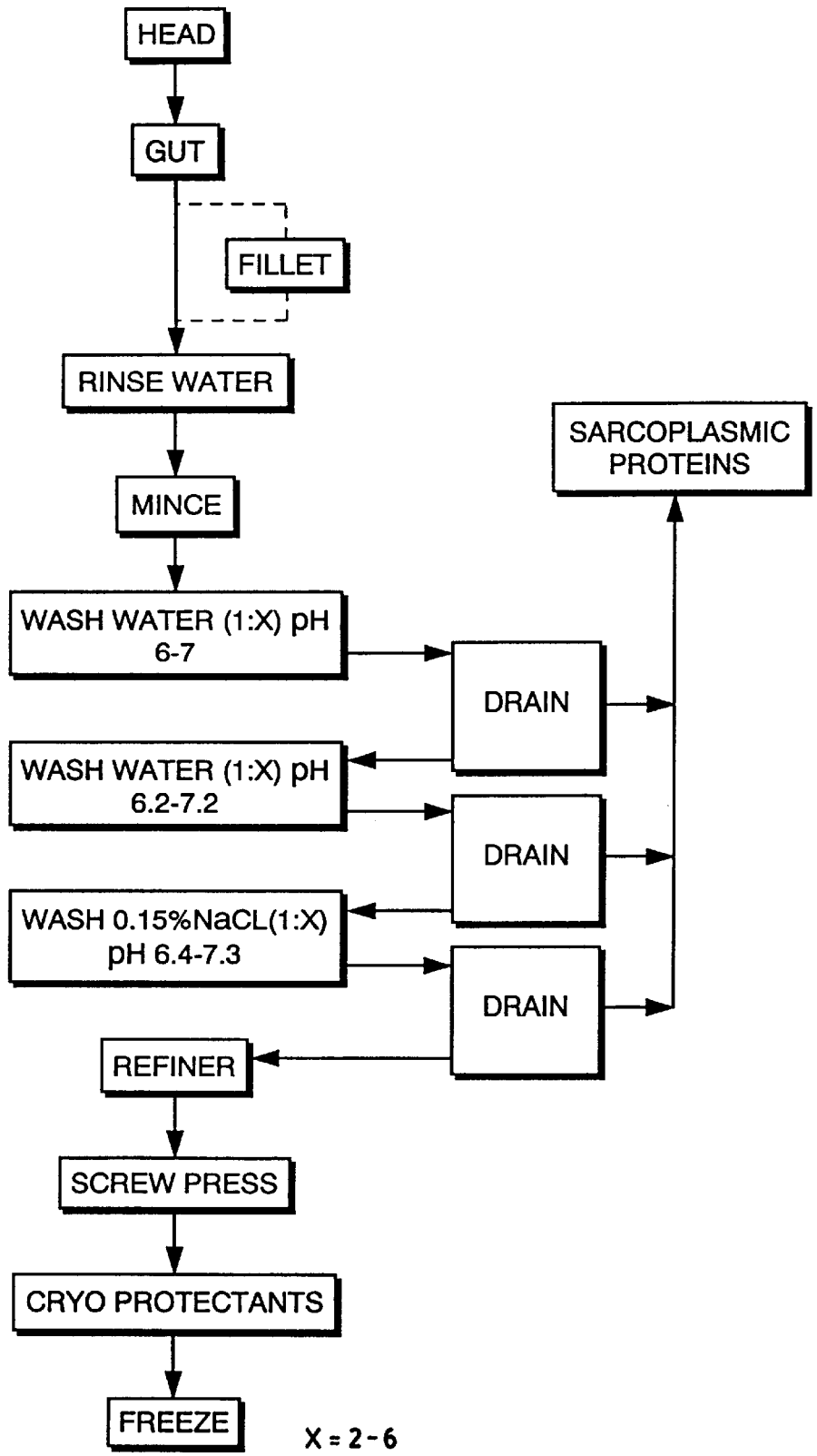
FIG. 2 is a schematic diagram of a conventional process of the prior art.
Figure 3:
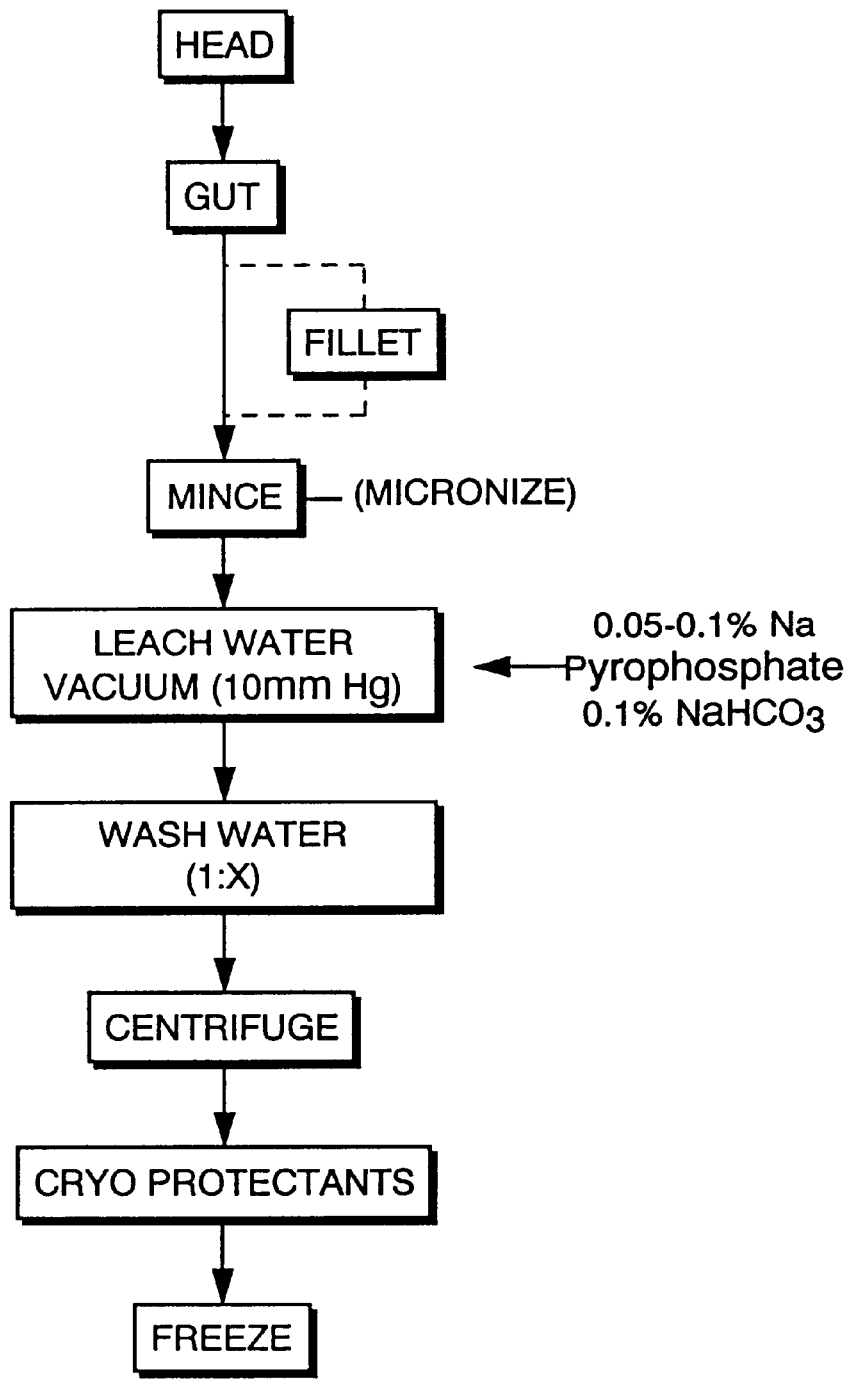
FIG. 3 is a schematic view of an improved conventional process of the prior art.
Figure 4:
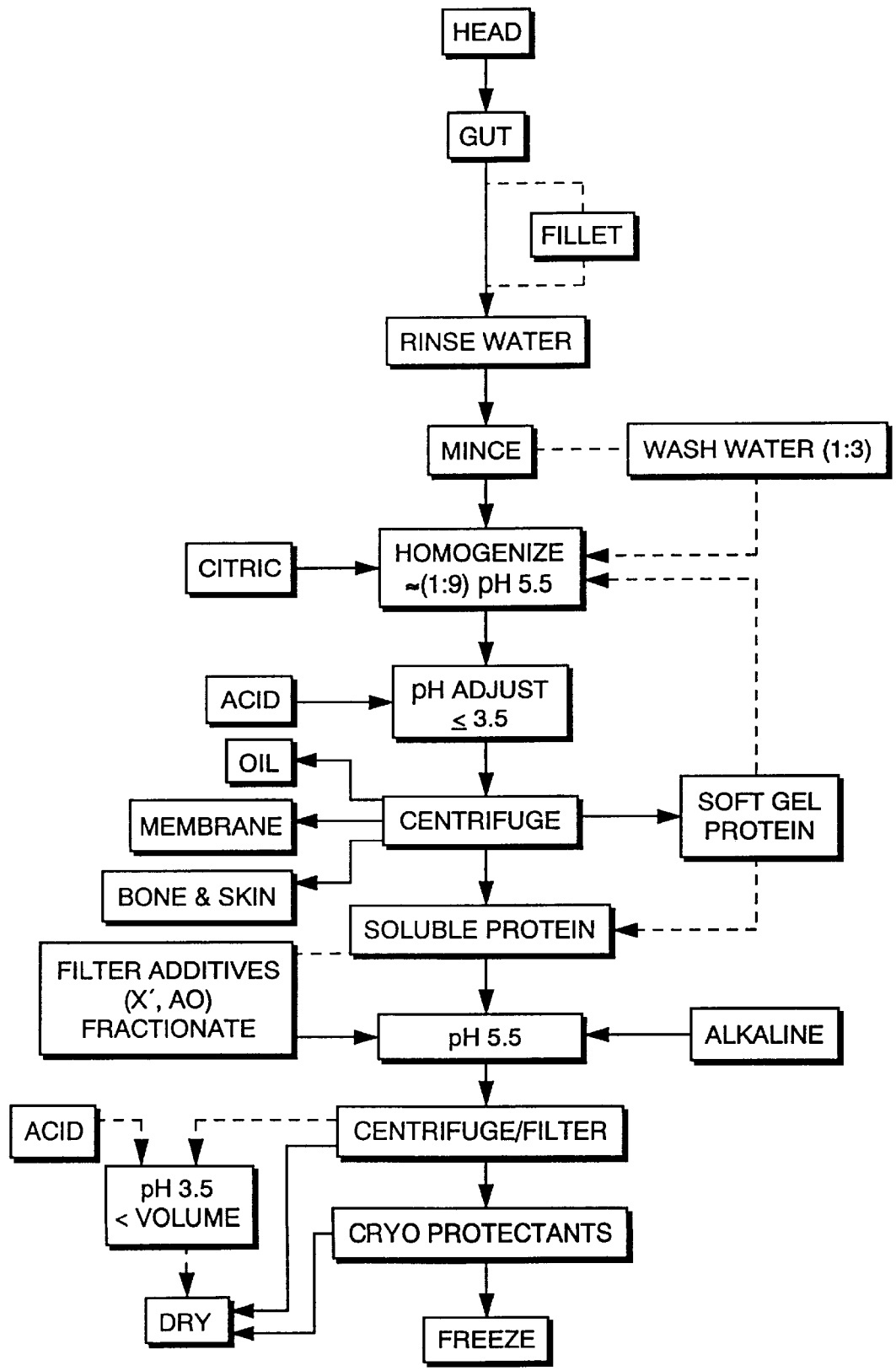
FIG. 4 is a schematic view of a preferred process of this invention.

The following is a description of a process developed to concentrate, and extract proteins from muscle sources in a manner that allows the proteins to retain their functionality (i.e., gelation, emulsification, etc.) throughout the process and into storage. The new acid solubilization/precipitation (ASP) preferred process of this invention is compared to the standard conventional procedure for surimi manufacture, as well as a recent improved conventional process. The improved conventional process was designed to produce a better gel with whiter color and to remove more lipid than was obtained using the conventional method. Flow diagrams for the three processes are shown in FIGS. 2, 3 and 4. In all three procedures the initial steps, heading, gutting, the optional filleting, rinsing and mincing are performed using standard fish processing equipment. It is after these initial steps that the ASP process of this invention substantially changes from the other two processes. The goals of the conventional and improved conventional processes are to keep the proteins under conditions which promote their insolubility, while washing away or removing undesirable soluble components. However, an undesirable sizable loss in protein results. Using the ASP process, conditions are adjusted to promote the solubilization of all the muscle proteins. The conditions are a pH of less than about 3.5 but not too low as to cause destruction to the proteins, and an ionic strength of less than or equal to about 200 mM.

Conventional Process

The basic steps of the conventional process are shown in FIG. 2. The amount of times or volumes in the wash steps can vary. Ground or minced fish is washed with refrigerated water ($\approx 6°$ C.) long enough and in large enough volumes to remove undesirable components. Over-washing of the flesh can cause swelling of the proteins, which has been shown to interfere with de-watering and to be deleterious to gel formation. A large proportion of the water soluble components are removed in the first wash with relatively less in subsequent washes. Time spent in the wash, or residence time, also determines washing effectiveness. Between 9–12 minutes has been shown to be an adequate effective residence time per wash. De-watering after each wash is accomplished using a rotary screen. This device is a continuous rolling screen with perforations of approximately 1 mm that allow a partial de-watering. Salt can be added to the final wash to facilitate dewatering. After the final partial de-watering, the washed mince is passed through a refiner. In the refiner, the washed mince is forced against a screen with 0.5 mm perforations under high pressure from a concentric auger. Refining is referred to as the "clean-up" step, where only finely minced muscle is allowed through the perforations. However, separation is not complete and some product is lost in this step. Diverted to a different location is the refiner run-off, which consists of tiny bone and skin fragments and dark muscle, which tends to form in particles larger than 0.5 mm. The refiner is effective at removing unwanted non-edible fragments, but it is not 100% efficient and some particles do get through to the mince. The moisture content at this stage of production is approximately 90%. High moisture allows the refining process to function more effectively. To reduce the moisture content down to the desired 80% refined mince is placed into a screw press. The screw press, like the refiner, pushes the mince against a screen with 0.5 mm perforations using an auger transport, except that the screw press is under higher pressures. Cryoprotectants are added to the de-watered mince to protect the proteins from freeze denaturation and preserve their functionality. A common mixture of cryoprotectants is 4% sucrose, 4% sorbitol and 0.2% sodium tripolyphosphate. In the final step, product is frozen in a plate freezer, which rapidly freezes the product to guard against protein denaturation as does occur during slow freezing.

Improved Conventional Process

The improved conventional process (FIG. 3) was designed to be used for fish with high fat contents. Three main points differentiate this process from the conventional process. First, it improves color (lightens) the product by using a "micronization" step, which decreases particle size down to 1–2 microns. This allows very efficient leaching of the undesirable components out of the tissue due to the large surface area. Second, the process also minces or micronizes the tissue under vacuum (10 mm Hg) which has been shown to be effective at reducing oxidation of the lipids. The low vapor pressure caused by the vacuum environment also promotes greater removal of low molecular weight compounds responsible for off or rancid odors. Third, the step in the process which produces the most dramatic effect to the products improvement is that of the addition of sodium bicarbonate (0.1%) and sodium pyrophosphate (0.05–0.1%) to the first wash. The compounds increase the pH of the first wash to approximately 7.2–7.5, which ultimately causes an increase in the gels elasticity and reduces the lipid content to approximately 1%. The process, however, also increases the amount of protein lost during the leaching step. Due to the micronization step, product has to be recovered using centrifugation, which can recover the minute washed tissue particles. The remaining cryoprotection and freezing steps are similar to the conventional process.

Acid Solubilization Precipitation (ASP) Process

As mentioned above, a preferred ASP process radically departs from the conventional and improved conventional process following the tissue disruption step. The whole tissue is homogenized in its dilution medium. The homogenization step places fish tissue (ground or whole) into a solution of 1 mM citric acid, pH 3.0, preferably at a ratio of 1 part tissue to 9 or more parts solution. Homogenization equipment that can be used is a Polytron Kinematic homogenizer on speed 76 (1–2 min). The procedure can be scaled up using an Urshel Commitrol Model 1700 or comparable piece of equipment. After homogenization, the pH of the resulting solution is approximately 5.3 to 5.5. At this pH, which is near the isoelectric point of many of the muscle proteins, the up-take of solution by the proteins is at a minimum. This prevents hydration of the proteins and keeps the viscosity low. The pH of the homogenate is then lowered to about pH 3.5 or lower using, but not limited to, hydrochloric acid (HCl). 1 M HCl typically was used, but other mineral or organic acids can perform equally well. The solution is then centrifuged, at which time the solution is separated into four phases. The upper (light) phase contains lipid, which was found to contain no detectable protein (Biuret). It is for this reason that it is believed this phase contains neutral lipid. It is also almost non-existent when lean fish (very low neutral lipid), such as Atlantic cod is used as the starting muscle source.

The sediment or pellet phase was found to contain skin and bone, in some crudely prepared samples, and membrane lipid. This lipid fraction contains protein. Both fractions of lipids were separated under mild conditions. Membrane lipids tend to be more unsaturated than neutral lipids and higher in eicosapentaenoic (EPA) and docosahexaenoic acids (DHA), which may be used as an excellent raw source in DHA/EPA products such as neutraceuticals. In the ASP process, the main reason for the elimination of the lipids, especially the membranes, is that these lipids are highly reactive and reduce the storage stability of the protein products. In prior attempts to make surimi style products from fatty fish, only limited success was achieved due to the development of rancid and oxidized odors emanating from the break-down of the lipid. Off odors and brown color development becomes greatly intensified in dehydrated protein products.

The third phase contains the aqueous protein source ($\leq$pH 3.5). When a 1:9 ratio of tissue: solution is used then the resultant protein concentration will be approximately 16 mg/ml for fish and 22 mg/ml for chicken. Viscosities for these solutions can vary from approximately 5 to 30 mpa.s depending on protein concentration. In virtually all muscle tissue examined using this low pH (and ionic strength) solubilization technique, solubility of the proteins has been between 90–100%. A condition termed, "soft gel" occurs as a fourth phase during the centrifugation when either the viscosity ($\geq \approx 35$ mpas) or the protein content ($\geq \approx 12$ mg/ml) is high. Under the centrifugal force, protein which contains water is formed into a soft mass which sediments along with the membrane lipid. Loss of protein during this process can be as high as 20%. The protein loss is due mainly to soluble protein trapped within the gel. Upon the completion of the centrifugation step and the return to atmospheric pressure, the soft gel reverts to a liquid with time, leaving only the membrane lipid in the sediment. Soluble protein is trapped in the gel and can be reprocessed. In a chicken breast muscle sample with 84% protein recovery, an additional 8% protein was recovered in the soft gel. Recycling the soft gel upstream or downstream in the process or preventing its formation, are ways to assure protein recoveries of 90% or greater.

At the stage in the process when the majority of proteins are in solution, processes such as heating (to destroy possible pathogens or enzymes), additive addition (antioxidants, polymer components, or protein crosslinkers) and/or fractionation of the proteins by size exclusion chromatography or ultrafiltration can be performed. Also, since liquid media are much easier to handle than solids, transporting the product with pumps can be done at this time.

In the next step, raising the pH to a point where the proteins are least soluble and precipitate can be accomplished using numerous types of alkaline compounds. A pH about 5.3 and 5.5 has been found to be most effective. Less than pH about 5.3 or more than a pH of about 5.5 leads to increased solubility and subsequent protein loss. The pH was increased using 1M NaOH for a coarse adjustment and 100 mM NaOH for fine adjustment. Once the solution is adjusted to a pH about 5.5, the proteins can be visualized as white "threads" in the solution. The threads start to appear at pH 3.8 and their concentration steadily increases as the pH increases to pH 5.5. At pH values greater than 5.5, the solution starts to thicken and takes on a glossy appearance. Samples centrifuged at these higher pHs have large amounts (as high as 40%) of their protein stay in the supernatant and are thus not recovered. Collecting the protein is accomplished by centrifugation; however, the protein can also be obtained by filtration. The moisture content of the sedimenting protein can be somewhat controlled by the centrifugation force. A centrifugation force of 34,000×gravity produced Atlantic cod protein with 78% moisture, whereas, a force of 2575×gravity (table top centrifuge) produced a sample with a moisture content of 84%. Salt or charged polymers also can be used to effect precipitation.

Collected protein can be manufactured into a standard surimi product by the addition of cryoprotectants such as 4% sucrose, 4% sorbitol and 1.3% sodium tripolyphosphate. The formula is similar to those in industry except that in the samples, more tripolyphosphate was used. This was done to raise the pH from 5.5 to approximately 7.0. The proteins with the cryoprotectants are frozen in a plate freezer, which is standard in the industry.

A protein powder having a pH of about 3.0 is useful in the manufacture of increased protein beverages, such as is found in fruit or sport drinks. To lower the moisture content, it is possible to precipitate the proteins at pH 5.5 and then re-acidify to pH 3.0 using, at most about one-tenth the original volume. This step was done using Atlantic cod proteins, where the protein in solution was increased from 1% to 6.1% prior to drying. This powder can also be used as an emulsifying agent in products such as mayonnaise or salad dressings.

Another product was produced by drying, under vacuum, the precipitated protein from Atlantic cod to which cryoprotectants were added. The powder was hydrated to produce a gel with a strain of 1.1, stress of 26.6 kPa, and a whiteness index of 61.2. Visually the gel contained small particles of tough tissue, which may have been areas where the proteins highly interacted with each other. The incorporation of low or high molecular weight agents, such as negatively charged starches, or sugars can improve the product by interfering with protein-protein interactions. These compounds can be added to the solution at low pH before precipitation.

Major Differences Between Processes

1. Yield

Using the conventional process, protein recoveries between 55–65% are commonly found using fish mince as the starting material. Both myofibrillar and sarcoplasmic proteins are removed during the washing steps, with a large majority of these proteins being sarcoplasmic. A large proportion of these proteins come off in the first wash step. The improved conventional process loses additional protein due to the increased pH in the first wash. Yields as low as 31% have been reported. In the ASP process of this invention, higher recoveries of proteins are obtained. Typical protein recoveries using the ASP process are shown in Table 1.

TABLE 1

Protein recoveries for different species using the ASP process

| Muscle type | Protein recovery (%) |
| --- | --- |
| Chicken breast | 84, 92*, 94 |
| Chicken thigh (dark) | 76 |
| Atlantic herring (light) | 88 |
| Atlantic mackerel (light) | 91 |
| Atlantic cod | 92 |
| capelin (headed and gutted) | 63 |

*recovery after the addition of the "soft gel" proteins

2. Lipid reduction

Lipid in the fish tissue is initially divided into two main groups, fats and oils (non-polar) and membrane lipids. The membrane lipids comprise both polar lipids, e.g., phospholipids and nonpolar lipids such as free fatty acids, cholesterol, vitamin E, or the like. The use of washings in the conventional process typically removes a larger proportion of non-polar lipid compared to membrane lipid. In a previous study using menhaden, the non-polar to polar ratio of the lipid was found to vary from 7.3 in the fillet to 2.4 in the final surimi. This demonstrated that the lipid that was being washed out was greater in neutral lipids. Using the conventional surimi manufacturing process consistently produced a product having a lipid content of approximately 3–3.5%, regardless of the lipid content of the starting fish.

Using sodium bicarbonate in the washing water (improved conventional process), in a study conducted by Zapata-Haynie Corporation, a finished "low fat" surimi was produced with a lipid content of 1.1%. This is consistent with the results others have obtained using the improved conventional process. When this "low fat" surimi was examined, the non-polar : polar ratio was found to be 1.2. These results show that as washing increases, the most unstable lipids (the membrane lipids) are not removed. These results suggest that approximately 0.5% of the weight of the finished surimi is membrane lipid. As stated above, this lipid tends to be more highly reactive than neutral lipid because of its higher degree of unsaturation.

Using the ASP process of this invention, much lower lipid contents are found in the finished products as compared to the conventional process and the improved conventional process. Lipid contents of this invention for different species is shown in Table 2.

TABLE 2

Lipid contents of protein precipitate for different species using the ASP process.

| | Lipid content (%) | |
| --- | --- | --- |
| Muscle type | Flesh | Precipitate |
| Atlantic cod | 0.8 | 0.12 |
| Atlantic mackerel | | |
| centrifuged (−membrane) | 6.5 | 0.14 |
| no centrifuge (+membrane) | 6.5 | 3.46 |

All the samples precipitated in Table 2 which had been centrifuged were substantially free of membrane lipids as determined by solvent extraction of the precipitated protein product with chloroform-methanol solvent.

The lipids were extracted from protein precipitated at pH 5.5.

The samples of Atlantic mackerel, with and without membrane, were examined for oxidation odor development during refrigerated storage. The sample with membrane developed oxidized odors after approximately 3 days storage, whereas the sample without membrane never developed these odors, but was discarded due to bacterial spoilage odors after about 8 days. It appears that removal of lipid is critical to the storage stability and quality of the finished product.

In the production of dried product, removal of the membrane lipid is crucial to the storage stability of the product. In Table 3, the color values for dried protein powders from Atlantic cod stored for six months at room temperature are shown. A much better color, based upon the higher whiteness indices obtained was observed on removal of the membrane from the protein samples prior to drying.

TABLE 3

Color values of freeze-dried Atlantic cod protein prepared using various techniques after 6 months storage at room temperature.

| | Color values | | | |
| --- | --- | --- | --- | --- |
| | L | a | b | Whiteness Index |
| Control (no centrifugation) | 73.41 ± 6.96 | 4.79 ± 2.32 | 17.61 ± 1.08 | 65.75 |
| AO added (no centrifugation) | 73.44 ± 14.11 | 4.47 ± 3.54 | 17.51 ± 4.08 | 67.88 |
| Centrifuged * | 89.66 ± 0.12 | −0.66 ± 0.01 | 3.37 ± 0.16 | 89.10 |

AO: antioxidants added prior to freeze drying, 0.2% sodium ascorbate, 0.2% sodium tripolyphosphate.
Centrifugation: 33,000 RPM, No. 35 Rotor 60 minutes. (1.27 × $10^5$ g).
Samples stored in oxygen permeable polyethylene pouches.
Whiteness Index = $100 - [(100 - L)^2 + a^2 + b^2]^{0.5}$.

One advantage to the elimination of lipid from the proteins is that it eliminates harmful toxins that are lipid soluble. In fish there is great concern about the accumulation of polychlorinated biphenyls (PCB) and polyaromatic hydrocarbons (PAH) in their oils. These, as well as other similar compounds, are considered major toxins to humans. Elimination or reduction of these compounds are considered a positive attribute of the process of this invention.

3. Gel Values

It is generally believed that a strain value of 1.9 is the minimum value needed to be obtained by a gel to be considered as a grade AA gel. The strain value is a measure of cohesiveness or elasticity, thought to be a desired attribute of an excellent gel. Table 4 reports the strain along with the stress values for samples manufactured using the ASP process. For a comparison, a strain value of 1.12 was obtained by using Atlantic mackerel surimi, manufactured using the conventional process on a semi-commercial scale at the NOAA/Mississippi State Univ. seafood pilot plant in Pascagoula, Miss.

TABLE 4

Rheological values for samples manufactured using the ASP process.

| Fish (quality) | Strain | Stress (kPa) |
|---|---|---|
| Atlantic cod (v. good) | 2.78 ± 0.91 | 21.98 ± 2.02 |
| Capelin (v. poor) | 2.31 ± 0.22 | 45.04 ± 11.15 |
| Atlantic mackerel light (fair) | 2.61 ± 0.09 | 31.11 ± 3.82 | mean ± standard deviation

4. Quality of Raw Fish

In the manufacture of gels from surimi using the conventional method, it is widely believed that only very high quality fish should be used. However, using the ASP process, gels of 2.6 strain and 31.1 kPa stress from mackerel light muscle in fair condition were obtained. In one experiment using frozen, extremely rancid, (greater than 4 years frozen storage at 14° F.), mackerel light muscle, values of 1.8 strain and 34.9 kPa stress were obtained. The capelin described in Table 4, was also frozen for an extended period of time (≈1 year). It had an extremely high thiobarbituric acid value (TBARS) of 148.5 μmol/kg, indicating much oxidation had taken place, thus making it unacceptable as an edible human food. But, it was still capable of producing a gel with excellent quality values.

5. Color

Gels produced from Stage II Atlantic mackerel using the ASP process produced Hunter L, a, b values of 78.4,−0.89, and 2.03 respectively, well within bounds for the colors of Grade AA surimi. The resultant whiteness index for this sample was 78.3. Values of about 75 or higher are considered excellent. Surimi from Atlantic cod produced using the ASP process developed even whiter gels than mackerel with a "L" value of 82.3, an "a" value of −0.11, and a "b" value of 2.88. The resultant whiteness index for this sample was 82.1.

6. Advantages to Liquid Form

The ASP process reduces animal muscle tissue from a solid into a low viscosity fluid with substantially all the proteins in solution. From a processing point of view, this provides a great advantage. Liquids are easier to handle than solids. A major problem in the surimi industry is that bones, skin and blemishes contaminate the end-product. However, as a liquid, proteins in the ASP process can be centrifuged or filtered to assure no contamination enters the final product. The use of the liquid protein solution also simplifies contaminant removal such as metal fragments from equipment. This is a major concern in the production of food. The liquid phase can also be easily temperature controlled in operations such as pasteurization for the elimination of pathogens or rapid cooling. Equipment to move liquids is also much cheaper than equipment needed to move solids. Having the proteins in a liquid form also facilitates fractionating the proteins for either increasing or eliminating specific or groups of proteins. The ASP process also saves processing time because it eliminates the time needed for three or more washes as in the conventional process and can eliminate the refining step. The solubilization step of the proteins takes very little time and can be accomplished in a one-pass system.

Summary

Overall, the ASP process is useful for processing a wide variety of animal muscles to produce a stable protein product in either frozen or dried form. The primary attributes of the process is that it permits the complete solubilization of substantially all of the muscle proteins into a low viscosity fluid. This fluid is then placed under centrifugal force to remove both major types of lipid (membrane, fats and oils), which results in a greatly stabilized product. While other processes somewhat reduce the lipid content, the ASP process is the only one capable of substantially reducing or eliminating the membrane lipid. The ASP process also provides a product having a low lipid content that still retains its protein functionality. The ASP process allows the proteins obtained to be used in a wide array of food grade products and product enhancers since the products retain the protein functionality.

We claim:

1. A protein rich solid composition isolated from an animal muscle tissue which comprises myofibrillar proteins substantially free of animal membrane lipids, said proteins capable of being formed into a gel.

2. The composition of claim 1 which contains at least about 8% up to about 30% by weight sarcoplasmic proteins based upon total weight of protein.

3. The composition of claim 1 which contains at least about 10% up to about 30% by weight sarcoplasmic proteins based upon total weight of protein.

4. The composition of claim 1 which contains at least about 15% up to about 30% by weight sarcoplasmic proteins based upon total weight of proteins.

5. The composition of claim 1 which contains at least about 18% up to about 30% by weight sarcoplasmic proteins based upon total weight of protein.

6. A protein rich composition isolated from an animal muscle tissue which comprises myofibrillar proteins substantially free of animal membrane lipids in aqueous solution having a pH less than about 3.5 said proteins capable of being formed into a gel.

7. The composition of claim 6 which contains at least about 8% up to about 30% by weight sarcoplasmic proteins, based on total weight of protein.

8. The composition of claim 6 which contains at least about 10% up to about 30% by weight sarcoplasmic proteins based on total weight of protein.

9. The composition of claim 6 which contains at least about 15% up to about 30% by weight sarcoplasmic proteins based on total weight of protein.

10. The composition of claim 6 which contains at least about 18% up to about 30% by weight sarcoplasmic proteins based on total weight of protein.

11. The composition of claim 6 wherein said pH is between about 2.5 and about 3.5.

12. A protein rich gel composition isolated from an animal muscle tissue which comprises myofibrillar proteins substantially free of animal membrane lipids.

13. The composition of claim 1 which contains at least about 8% up to about 30% by weight sarcoplasmic proteins based upon total weight of protein.

14. The composition of claim 1 which contains at least about 10% up to about 30% by weight sarcoplasmic proteins based upon total weight of protein.

15. The composition of claim 1 which contains at least about 15% up to about 30% by weight sarcoplasmic proteins based upon total weight of protein.

16. The composition of claim 1 which contains at least about 18% up to about 30% by weight sarcoplasmic proteins based upon total weight of protein.

17. The composition of any one of claims 1, 6 and 12 wherein said animal muscle tissue is fish muscle tissue.

18. The composition of claim 17 wherein said fish muscle tissue is pelagic fish muscle tissue.

19. The composition of any one of claims 1, 6 and 12 wherein said animal muscle tissue is chicken muscle tissue.

20. The composition of any one of claims 2, 7 and 13 wherein said animal muscle tissue is fish muscle tissue.

21. The composition of claim 20 wherein said fish muscle tissue is pelagic fish muscle tissue.

22. The composition of any one of claims 2, 7 and 13 wherein said animal muscle tissue is chicken muscle tissue.

* * * * *

UNITED STATES PATENT AND TRADEMARK OFFICE
CERTIFICATE OF CORRECTION

PATENT NO. : 6,005,073
DATED : December 21, 1999
INVENTOR(S): Herbert O. Hultin & Stephen D. Kelleher It is certified that error appears in the above-identified patent and that said Letters Patent is hereby corrected as shown below:

On the title page, item [54] and Column 1,
., Replace the Title with - PROTEIN COMPOSITION ISOLATED FROM A MUSCLE SOURCE -

Column 4, Line 66, after "invention", insert - an animal muscle tissue source of protein is -

Column 4, Line 67, replace ", as" with - . As -

Claim 13, Line 1, replace "1" with - 12 -

Claim 14, Line 1, replace "1" with - 12 -

Claim 15, Line 1, replace "1" with - 12 -

Claim 16, Line 1, replace "1" with - 12 -

Signed and Sealed this

Fifteenth Day of August, 2000

Attest:

Q. TODD DICKINSON

Attesting Officer    Director of Patents and Trademarks